(12) United States Patent
Parekh et al.

(10) Patent No.: US 12,346,963 B2
(45) Date of Patent: *Jul. 1, 2025

(54) IDENTIFYING AND PROVIDING UNFULFILLED SERVICES VIA AN ATM

(71) Applicant: Wells Fargo Bank, N.A., San Francisco, CA (US)

(72) Inventors: Pankaj Parekh, San Francisco, CA (US); Steve Perez, San Francisco, CA (US); Keith Clithero, Charlotte, NC (US); Daniel Sanford, Charlotte, NC (US); Bill Wurz, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,632

(22) Filed: Feb. 6, 2024

(65) Prior Publication Data

US 2024/0177234 A1 May 30, 2024

Related U.S. Application Data

(63) Continuation of application No. 17/088,145, filed on Nov. 3, 2020, now Pat. No. 11,935,116.

(51) Int. Cl.
*G06Q 40/03* (2023.01)
*G06Q 20/10* (2012.01)
(Continued)

(52) U.S. Cl.
CPC ......... *G06Q 40/03* (2023.01); *G06Q 20/1085* (2013.01); *H04W 4/024* (2018.02);
(Continued)

(58) Field of Classification Search
CPC ........ G06Q 10/10; G06Q 20/32; G06Q 20/20; G06Q 20/10; G06Q 20/40; G06Q 20/36;
(Continued)

(56) References Cited

U.S. PATENT DOCUMENTS

| | | |
|---|---|---|
| 7,051,927 B2 | 5/2006 | Murison |
| 7,587,196 B2 | 9/2009 | Hansen |

(Continued)

*Primary Examiner* — Hao Fu
(74) *Attorney, Agent, or Firm* — Foley & Lardner LLP (57) ABSTRACT

Systems and methods for identifying and providing unfulfilled services to a user of a provider institution mobile application are provided. A method includes: identifying an unfulfilled service of the user of the provider institution mobile application based on an indication that the user has a pending service that requires further action on behalf of the user; scanning a digital calendar of a mobile device of the user hosting the provider institution mobile application based on receiving a user input to access the digital calendar; determining an availability of the user based on scanning the digital calendar; identifying a current location of the user during the determined availability; determining a plurality of service locations near the identified current location of the user during the determined availability; and prompting the user to visit an identified service location from the plurality of service locations.

20 Claims, 4 Drawing Sheets

(51) Int. Cl.
*H04W 4/02* (2018.01)
*H04W 4/024* (2018.01)
*H04W 12/06* (2021.01)
*H04W 12/47* (2021.01)

(52) U.S. Cl.
CPC .......... *H04W 4/025* (2013.01); *H04W 12/06* (2013.01); *H04W 12/47* (2021.01)

(58) Field of Classification Search
CPC ........ G06Q 30/02; G06Q 40/02; G06Q 40/03; G06Q 20/1085
See application file for complete search history.

(56) References Cited

U.S. PATENT DOCUMENTS

| | | | |
|---|---|---|---|
| 8,165,900 B2 | 4/2012 | Larsen | |
| 8,423,465 B1 * | 4/2013 | McGraw, IV | G07F 19/209 |
| | | | 705/43 |
| 8,615,439 B2 | 12/2013 | Ramaratnam et al. | |
| 8,751,405 B2 | 6/2014 | Ramaratnam et al. | |
| 8,849,703 B2 | 9/2014 | Ramaratnam et al. | |
| 9,033,214 B2 | 5/2015 | Siddle et al. | |
| 9,092,763 B2 | 7/2015 | Meszaros et al. | |
| 9,355,530 B1 | 5/2016 | Block et al. | |
| 9,519,896 B2 | 12/2016 | Block et al. | |
| 9,626,665 B2 | 4/2017 | Meszaros et al. | |
| 10,535,045 B2 | 1/2020 | Meszaros et al. | |
| 2005/0021384 A1 * | 1/2005 | Pantaleo | G06Q 10/06 |
| | | | 705/7.22 |
| 2013/0275237 A1 | 10/2013 | Ramaratnam et al. | |
| 2013/0275239 A1 | 10/2013 | Ramaratnam et al. | |
| 2013/0275241 A1 | 10/2013 | Ramaratnam et al. | |
| 2013/0275242 A1 | 10/2013 | Ramaratnam et al. | |
| 2013/0275246 A1 | 10/2013 | Ramaratnam et al. | |
| 2013/0275247 A1 | 10/2013 | Ramaratnam et al. | |
| 2014/0081858 A1 | 3/2014 | Block et al. | |
| 2014/0351133 A1 * | 11/2014 | Christian | G06Q 20/3276 |
| | | | 705/44 |
| 2015/0006434 A1 | 1/2015 | Niethold | |
| 2015/0100442 A1 | 4/2015 | Van Heerden et al. | |
| 2015/0100443 A1 | 4/2015 | Van Heerden et al. | |
| 2015/0317720 A1 | 11/2015 | Ramaratnam et al. | |
| 2016/0182529 A1 * | 6/2016 | Biehl | H04W 12/08 |
| | | | 726/1 |
| 2016/0275760 A1 | 9/2016 | Block et al. | |
| 2017/0103370 A1 * | 4/2017 | Kuchenski | G06Q 10/1095 |
| 2017/0323279 A1 | 11/2017 | Dion et al. | |
| 2017/0364881 A1 | 12/2017 | Meszaros et al. | |
| 2018/0247275 A1 * | 8/2018 | Petrov | G06Q 20/405 |

* cited by examiner

FIG. 4

IDENTIFYING AND PROVIDING UNFULFILLED SERVICES VIA AN ATM

CROSS-REFERENCE TO RELATED APPLICATIONS

This application is a continuation of U.S. patent application Ser. No. 17/088,145 filed Nov. 3, 2020, which is incorporated herein by reference in its entirety and for all purposes.

TECHNICAL FIELD

The present application relates to identifying and providing unfulfilled services of a user via an automated teller machine ("ATM").

BACKGROUND

Typically, provider institution customers frequently start and stop various services and do not complete them (e.g., an application for a service, such as mortgage application). The customers may be difficult to reach, too busy to fulfill the unfulfilled service, and otherwise do not complete the unfulfilled services in a timely manner. Customers may be frustrated from this experience in that they may believe they completed the service but, in fact, have not completed the service. Further, this scenario is particularly taxing on the institution that keeps track of these partially-completed records, which may take up valuable, either physical or computer memory space. It would be desirable to promptly facilitate completion of unfulfilled services.

SUMMARY

A first embodiment relates to a method for identifying and providing unfulfilled services to a user of a provider institution mobile application. The method includes identifying, by a provider institution computing system associated with a provider institution, an unfulfilled service of the user of the provider institution mobile application based on a flag stored in an accounts database of the provider institution computing system. The flag indicates that the user has a pending service that requires further action on behalf of the user. The method includes scanning, by the provider institution computing system, a digital calendar of a mobile device of the user hosting the provider institution mobile application based on receiving a user input to access the digital calendar. The method further includes determining, by the provider institution computing system, an availability of the user based on scanning the digital calendar. The method further includes identifying, by the provider institution computing system, a current location of the user during the determined availability; determining, by the provider institution computing system, a plurality of service locations near the identified current location of the user during the determined availability; and, prompting, by the provider institution computing system via the provider institution mobile application, the user to visit an identified service location from the plurality of service locations.

Another embodiment relates to a provider institution computing system. The provider institution computing system includes a network interface circuit structured to communicate information over a network and a processing circuit including a processor and a memory. The memory stores instructions that when executed by the processor cause the processing circuit to perform operations including: identify an unfulfilled service of a user of a provider institution mobile application based on a flag stored in an accounts database of the provider institution computing system, wherein the flag indicates that the user has a pending service that requires further action on behalf of the user; scan a digital calendar of a mobile device of the user hosting the provider institution mobile application based on receiving a user input to access the digital calendar; determine an availability of the user based on scanning the digital calendar; identify a current location of the user during the determined availability; determine a plurality of service locations near the identified current location of the user during the determined availability; and, prompt the user to visit an identified service location from the plurality of service locations.

Yet another embodiment relates to a mobile device. The mobile device includes a network circuit structured to communicate data to and from a provider institution computing system; an input/output device structured to exchange data with a user; a processor; and a memory configured to store program instructions of a provider institution mobile application that are executable by the processor to cause certain operations. The operations include: receive, from the provider institution computing system, an indication of an unfulfilled service of the user of the provider institution mobile application; access and scan a digital calendar of the mobile device of the user hosting the provider institution mobile application based on receiving a user input to access the digital calendar; determine an upcoming availability of the user based on the scanned digital calendar; determine a current location of the user during the determined upcoming availability; determine a plurality of service locations near the identified current location of the user during the determined availability; filter the determined plurality of service locations based on a capability of the determined plurality of service locations relative to the indicated unfulfilled service to identify a service location from within the plurality of service locations; and prompt, via a display of the mobile device, the user to visit the identified service location during the determined upcoming availability.

These and other features, together with the organization and manner of operation thereof, will become apparent from the following detailed description when taken in conjunction with the accompanying drawings.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the aspects and embodiments of the innovation relate to identifying a user with unfulfilled services, assessing or analyzing a schedule of the user, and directing the user to an appropriate location (e.g., an ATM) to conveniently complete the unfulfilled service based on the user's schedule and availability. The unfulfilled services may be identified by a provider institution computing system associated with a provider institution, and analyzed in conjunction with the user's availability, geographical location, and other variables in order to provide a convenient solution to the user. The "unfulfilled" service refers to either a user starting and not finishing a service, such as a loan document where the user has not signed or initial in the required spots, or not providing the necessary response for the system to consider the task complete, such as the user not confirming their mobile phone number. The services that are started and not finished ("in process" services), such as not completing and submitting mortgage, loan application, account application, and so on documents, are primarily described as the "unfulfilled services" herein. However, this disclosure is also applicable with above-described scenario where the provider institution requires an input from the user to consider a task complete.

There are a myriad of issues associated with having unfulfilled services. For example, there may be many extraneous data transmissions across a network and to a user mobile device as a result of the provider institution trying to contact the users. These extraneous data transmissions that fail to solve the issue take a tangible toll on not only the network and the network interfaces of all the devices involved, but also unnecessarily waste further resources, such as processing power, memory space, and battery life. The innovations described herein provide a technical solution to these issues by providing users with a directed, convenient process to fulfill their services thereby reducing the total transmissions needed on a per case basis. Furthermore, by reducing the amount of total transmissions, improvements are garnered in the tangential and/or correlated resources required to transmit data. For example, typical data transmission requires power consumption, CPU clock cycles, and memory allocation. These resource expenditures occur on both sides of the transmission as well. That is, the transmission issuing system must expend resources and the receiving device, likewise, must expend resources to receive, interpret, and act upon the transmission (e.g., a display, a prompt, etc.), as instructed by the transmission. Accordingly, by reducing the total amount of transmissions occurring on behalf of unfulfilled services, the entire computational ecosystem is impacted and improved. These and other features and benefits are described more fully herein.

Figure 1:
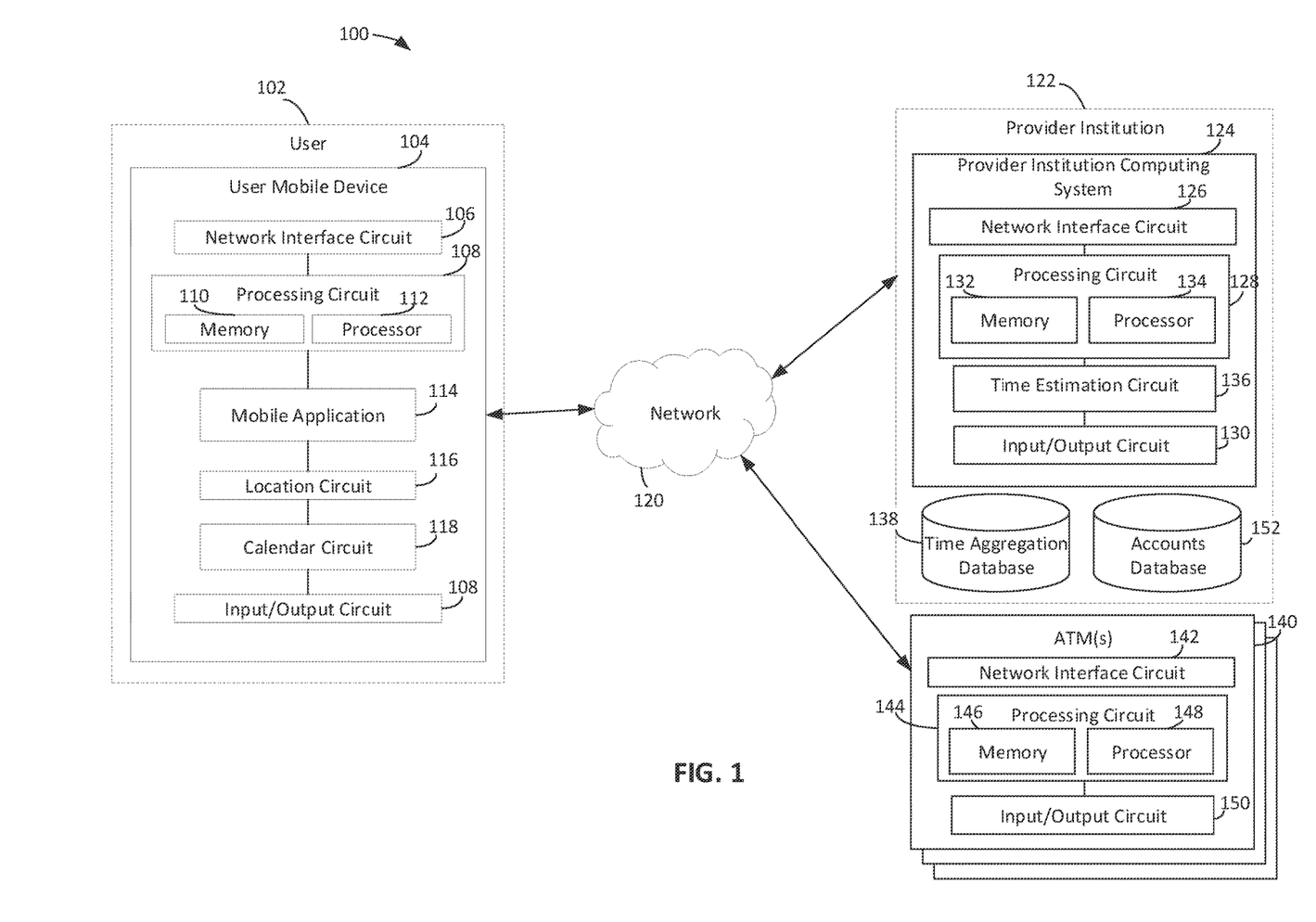
FIG. 1 is a schematic diagram of an unfulfilled services computing system, according to an example embodiment.

Referring now to FIG. 1, a schematic diagram of an unfulfilled services computing system 100 is shown, according to an example embodiment. The unfulfilled services computing system 100 includes a user mobile device 104, a provider institution computing system 124, and an ATM(s) 140. The user mobile device 104, the provider institution computing system 124, and the ATM(s) are each communicably coupled and configured to exchange information over a network 120, which may include one or more of the Internet, cellular network, Wi-Fi, Wi-Max, a proprietary banking network, a proprietary retail or service provider network, or other type of wired or wireless network.

The user mobile device 104 may be a mobile computing device associated with a user 102 (e.g., owned by, used by, etc.). The user mobile device 104 may include a mobile phone, a tablet, a laptop, a wearable device, a virtual/augmented reality (VR/AR) device, and/or other suitable mobile user computing devices capable of accessing and communicating using local and/or global networks (e.g., the network 120). Wearable computing devices refer to types of devices that an individual wears, including, but not limited to, a watch (e.g., a smart watch), glasses (e.g., eye glasses, sunglasses, smart glasses, etc.), bracelet (e.g., a smart bracelet), etc.

The user 102 may be a customer or client of the provider institution associated with the provider institution computing system 124 (e.g., an account holder). In other embodiments, the user 102 may be a prospective customer of the provider institution 122 (e.g., the user 102 has installed the mobile application 114 but has yet to open an account at the provider institution 122). Accordingly, the user 102 may be an individual, a representative(s) of a small or large business entity, and any other customer or prospective customer of the provider institution.

The user mobile device 104 is shown to include a network interface circuit 106, a processing circuit 108, a mobile application 114, a location circuit 116, a calendar circuit 118, and an input/output circuit 108. The network interface circuit 106 is structured to establish connections with other computing systems (e.g., the provider institution computing system 124) via the network 120. Accordingly, the network interface circuit 106 enables the user mobile device 104 to transmit and/or receive information to and/or from the provider institution computing system 124 over the network 120. The network interface circuit 106 includes program logic that facilitates connection of the user mobile device 104 to the network 120. For example, the network interface circuit 106 may include a combination of wireless network transceivers (e.g., a cellular modem, a NFC transceiver, a Bluetooth transceiver, a Wi-Fi transceiver, etc.) and/or a wired network transceivers (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

The processing circuit 108 includes a memory 110 and a processor 112. The memory 110 may be one or more memory or storage devices (e.g., RAM, ROM, Flash memory, hard disk storage) for storing data and/or computer code for completing and/or facilitating the various processes described herein. Memory 110 may be or include non-transient volatile memory, non-volatile memory, and non-transitory computer storage media. Memory 110 may include database components, object code components, script components, or other types of information structured for supporting the various activities and information structures described herein. The memory 110 may be coupled to the processor 112 and include computer code or instructions for executing one or more processes described herein. The processor 112 may be implemented as one or more processors, application specific integrated circuits (ASICs), field programmable gate arrays (FPGAs), a group of processing components, or other suitable electronic processing components. As such, the user mobile device 104 is configured to run a variety of application programs and store associated data in a database of the memory 110. One such application may be the provider institution 122 mobile application 114.

The user mobile device 104 includes a mobile application 114 (also referred to herein as client application 114, mobile client application 114, and/or provider institution client application 114) that is provided and coupled to the provider institution computing system 124. In some arrangements, the mobile application 114 may be a standalone application or be incorporated with an existing application of the user mobile device 104 (e.g., integrated into a mobile banking application, a service provider application, etc.). The mobile application 114 may be downloaded by the user mobile device 104 prior to its usage, hard coded into the memory 110 of the user mobile device 104, or be a network-based or web-based interface application such that the provider institution computing system 124 may provide a web browser to access the application, which may be executed remotely from the user mobile device 104. In the example shown, the mobile application 114 is downloaded to the user device and provided by the provider institution computing system via, for example, an app store for download. In the example shown, the mobile application 114 is structured as a mobile banking application. The mobile banking application 114 may be developed and maintained (e.g., provided with software updates on a regular or semi-regular basis) by the provider institution 122 using the provider institution computing system 124. Accordingly, the user mobile device 104 may include software and/or hardware capable of implementing a network-based or web-based application. For example, in some instances, the mobile application 114 includes software such as HTML, XML, WML, SGML, PHP (Hypertext Preprocessor), CGI, and like languages.

In the latter instance, the user (e.g., the user 102) may have to log onto or access the web-based interface before usage of the application. Further, and in this regard, the mobile application 114 may be supported by the provider institution computing system 124 via one or more servers, processors, network interface circuits, etc. that transmit applications for use to the user mobile device 104. Furthermore, prior to use of the mobile application 114 and/or at various points throughout the use of the mobile application 114, the user (e.g., the user 102) may be required to provide various authentication information or log-in credentials (e.g., a password, a pass code, a personal identification number (PIN), a fingerprint scan, a retinal scan, a voice sample, a face scan, any other type of biometric security scan) to ensure that the user 102 associated with the user mobile device 104 is authorized to use the mobile application 114.

The mobile application 114 is structured to generate and provide displays to the user of the mobile device 104 to provide information pertaining to accounts held at the provider institution 122 and associated with the user 102. Accordingly and among potentially other functions, the user may manage their accounts at the provider institution 122 via the mobile application 114. The mobile application 114 may provide information including account balances, recent account activity, various account-based warnings (e.g., low-balance warnings, inactive account warnings, etc.), integrated maps and time estimates (e.g., as part of an unfulfilled service method, as described in FIG. 3), and/or other relevant data pertaining to the user 102.

The location circuit 116 is coupled to the mobile application 114. The location circuit 116 is configured to utilize or include a variety of technologies, communication protocols, and/or sensors on the user mobile device 104 to generate or receive data to determine a location of the user mobile device 104 (e.g., Wi-Fi, GPS, RFID, cellular data, etc.). The location circuit 116 may be linked, either tangibly via hardware, or indirectly via software, with such technologies, communication protocols, and/or sensors of the user mobile device 104. Additionally, the mobile application 114 is configured to utilize the location circuit 116 in order to determine current and previous locations of the user 102.

Figure 3:
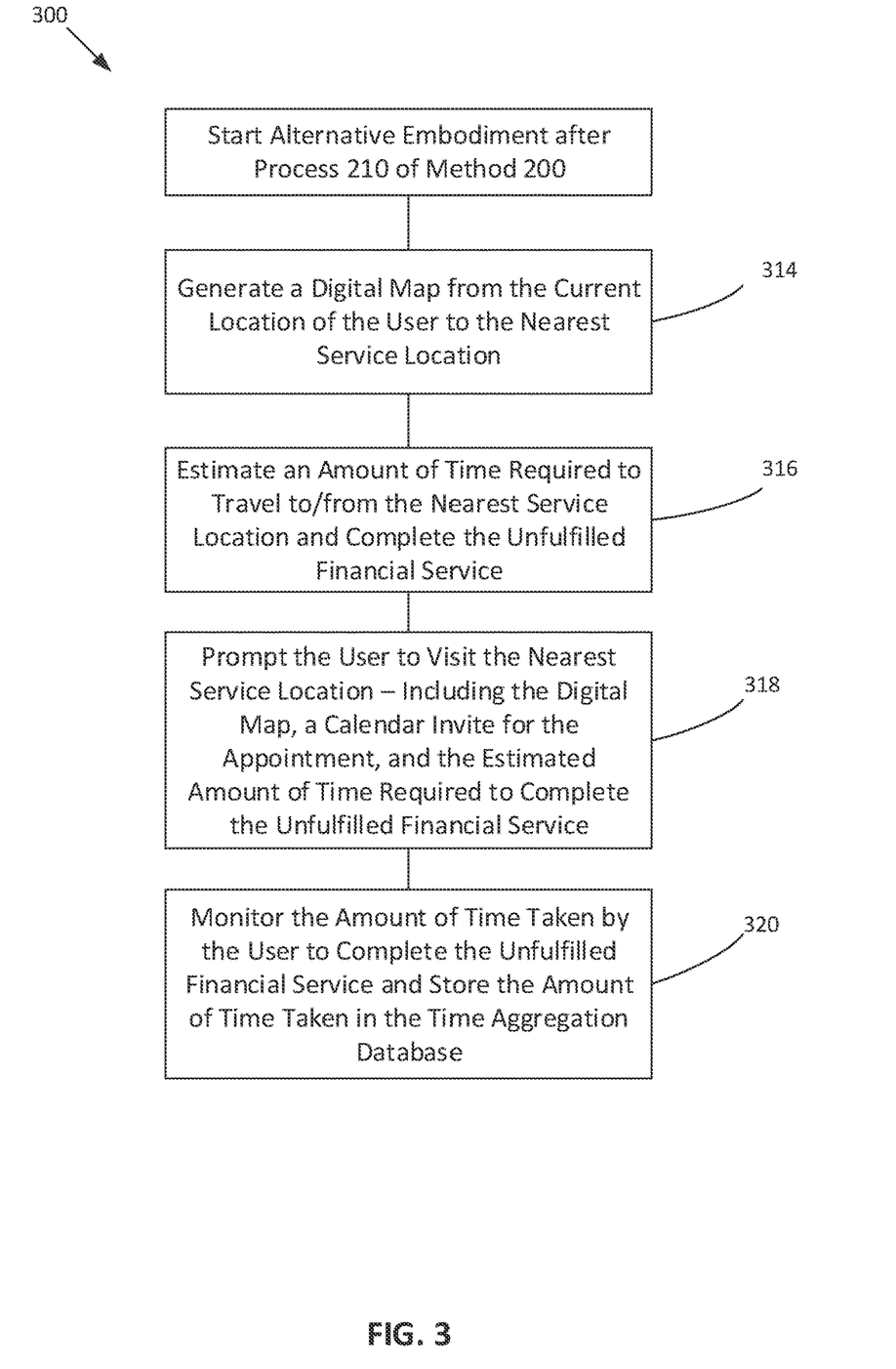
FIG. 3 is a flow diagram of an alternative method relative to FIG. 2 for identifying and providing unfulfilled services to a user, according to an example embodiment.

Still referring to FIG. 1, the mobile application 114 is configured to use the calendar circuit 118 to determine an availability of the user 102, schedule appointments (e.g., either through a native calendar functionality of the mobile application 114 or via established, third-party calendar applications, such as provided by Microsoft, Google, Apple, etc.), and to determine, in conjunction with the location circuit 116, an estimated time for completing an unfulfilled service based on the location of an upcoming appointment relative to an available service location of the provider institution 122 (e.g., as discussed further below and in particular, with reference to FIG. 3). The calendar circuit 118 is structured to interact with a calendar application on the user mobile device 104 (e.g., either a native calendar application of the mobile application 114 or third-party calendar applications) through, for example, one or more APIs. Furthermore, the calendar circuit 118 may scan, parse, or otherwise analyze the contents of such calendar application (e.g., via an API call) in order to determine working (or otherwise occupied) and home (or otherwise unoccupied) hours of the day for the user 102. In some embodiments, the calendar circuit 118 may require an opt-in from the user 102 before the aforementioned functionality is activated and retrieved via the provider institution mobile application 114.

The input/output circuit 108 is structured to receive communications from and provide communications to the user 102. In this regard, the input/output circuit 108 is structured to exchange data, communications, instructions, etc. with an input/output component of the user mobile device 104. In one embodiment, the input/output circuit 108 includes an input/output device. In another embodiment, the input/output circuit 108 includes communication circuitry for facilitating the exchange of data, values, messages, and the like between an input/output device and the components of the user mobile device 104. In yet another embodiment, the input/output circuit 108 includes machine-readable media for facilitating the exchange of information between an input/output device and the components of the user mobile device 104. In still another embodiment, the input/output circuit 108 includes a combination of hardware components, communication circuitry, and machine-readable media.

For example, in some embodiments, the input/output circuit 108 may include suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 108 provides an interface for the user 102 to interact with various applications (e.g., the mobile application 114) stored on the user mobile device 104.

Still referring to FIG. 1, the provider institution computing system 124 is associated with (e.g., owned, managed, and/or operated by) the provider institution 122. The provider institution 122 may be, for example, a credit card issuer, a bank, or other financial institution. In other embodiments, the provider institution may be an entity that owns or otherwise operates ATMs such as the ATM 140, which may be or not be a financial institution. The provider institution computing system 124 may be implemented as a discrete server, a group of two or more computing devices/servers, a distributed computing network, a cloud computing network, and/or other types of computing systems capable of accessing and communicating using local and/or global networks (e.g., the network 120).

The provider institution computing system 124 includes a network interface circuit 126, a processing circuit 128, a time estimation circuit 136, and an input/output circuit 130. The provider institution computing system 124 is also associated with a time aggregation database 138 and an accounts database 152. In some embodiments, the time aggregation database 138 and the accounts database 152 may be a part of the provider institution computing system 124. In other embodiments, the time aggregation database 138 and the accounts database 152 may be a part of another computing system, accessed as needed by the provider institution computing system 124. It yet other embodiments, the time aggregation database 138 may be a part of the provider institution computing system 124 and the accounts database 152 may be a part of another computing system, accessed as needed by the provider institution computing system 124. In another embodiment, the accounts database 152 may be a part of the provider institution computing system 124 and the time aggregation database 138 may be a part of another computing system, accessed as needed by the provider institution computing system 124.

The network interface circuit 126 is structured and used to establish connections with other computing systems (e.g., the user mobile device 104, the ATM 140, other computing systems, etc.), by way of the network 120. The network interface circuit 126 may include program logic that facilitates connection of the provider institution computing system 124 to the network 120. For example, the network interface circuit 126 may include a combination of a wireless network transceivers (e.g., a NFC transceiver, a Bluetooth transceiver, a Wi-Fi transceiver, etc.) and/or a wired network transceiver (e.g., an Ethernet transceiver). In some arrangements, the network interface circuit 126 includes the hardware and machine-readable media sufficient to support communication over multiple channels of data communication. Further, in some arrangements, the network interface circuit 126 includes cryptography capabilities to establish a secure or relatively secure communication session in which data communicated over the session is encrypted.

The processing circuit 128 includes a memory 132 and a processor 134. The memory 132 may be one or more devices (e.g., RAM, ROM, Flash memory, hard disk storage) for storing data and/or computer code for completing and/or facilitating the various processes described herein. Memory 132 may be or include non-transient volatile memory, non-volatile memory, and non-transitory computer storage media. Memory 132 may include database components, object code components, script components, or other types of information structured for supporting the various activities and information structures described herein. The memory 132 may be coupled to the processor 134 and include computer code or instructions for executing one or more processes described herein. The processor 134 may be implemented as one or more processors, application specific integrated circuits (ASICs), field programmable gate arrays (FPGAs), a group of processing components, or other suitable electronic processing components. As such, the provider institution computing system 124 is configured to run a variety of application programs and store associated data in a database of the memory 132.

The provider institution computing system 124 further includes a time estimation circuit 136. The time estimation circuit 136 is configured to retrievably store a variety of user information in the time aggregation database 138 pertaining to users and previously completed services (e.g., the service type, the service location, how busy the service location typically is at the service start time/day, the day of the week, the service start time, the service end time, complications associated with the service which result in completion delays, etc.). The time estimation circuit 136 is further configured to estimate an amount of time required to complete an unfulfilled service based on the stored data of the time aggregation database 138 (e.g., as discussed above and herein with respect to FIG. 3).

The time aggregation database 138 is configured to hold, store, categorize, and/or otherwise serve as a repository for information pertaining to users and a plurality of data points associated with previously completed services (e.g., as discussed above). Accordingly, the time estimation circuit 136 is configured to access the time aggregation database 138 to retrieve information pertaining to a particular service, the service representative of the unfulfilled service of the user 102.

The accounts database 152 is configured to hold, store, categorize, and/or otherwise serve as a repository for information pertaining to user account information, such as account balances, recent transactions, unfulfilled service flags, documents associated with unfulfilled services, etc. In this regard, the database stores information relating to unfulfilled services and sets flags or other indicators for those accounts with unfulfilled services.

The input/output circuit 130 of the provider institution computing system 124 is structured to exchange data, communications, instructions, etc. with an input/output component of the provider institution computing system 124 (e.g., a keyboard, a mouse, etc.) (e.g., with a provider institution employee, non-employee, operator, etc.). In one embodiment, the input/output circuit 130 includes an input/output device. In another embodiment, the input/output circuit 130 includes communication circuitry for facilitating the exchange of data, values, messages, and the like between an input/output device and the components of the provider institution computing system 124. In yet another embodiment, the input/output circuit 130 includes machine-readable media for facilitating the exchange of information between an input/output device and the components of the provider institution computing system 124. In still another embodiment, the input/output circuit 130 includes a combination of hardware components, communication circuitry, and machine-readable media. For example, the input/output circuit 130 is structured to receive communications from, and provide communications to, various provider institution 122 employees associated with the provider institution computing system 124.

The ATM(s) 140 are electronic devices which enable a user 102 to perform financial operations. The financial operations may be, for example, cash withdrawals, deposits, fund transfers, operations pertaining to provider institution 122 documents (viewing and/or filling out documents, such as a loan approval document), and account information inquiries. In the example, shown the ATM(s) 140 are network-enabled ATM(s) 140. In some other embodiments, the ATM 140 may not contain a network interface circuit 142 and may not be network-enabled. Being networked, the ATM may communicate over the network with the provider institution computing system and/or mobile device.

The ATM(s) 140 contains a network interface circuit 142, a processing circuit 144, and an input/output circuit 150. The network interface circuit 142 is structured and used to establish connections with other computing systems (e.g., the user mobile device 104, the provider institution computing system 124, etc.), by way of the network 120. The network interface circuit 142 may include program logic that facilitates connection of the ATM 140 to the network 120.

For example, the network interface circuit 142 may include a combination of a wireless network transceivers (e.g., a NFC transceiver, a Bluetooth transceiver, a Wi-Fi transceiver, etc.) and/or a wired network transceiver (e.g., an Ethernet transceiver). In some arrangements, the network interface circuit 142 includes the hardware and machine-readable media sufficient to support communication over multiple channels of data communication. Further, in some arrangements, the network interface circuit 142 includes cryptography capabilities to establish a secure or relatively secure communication session in which data communicated over the session is encrypted.

The processing circuit 144 includes a memory 146 coupled to a processor 148. The memory 146 may be one or more devices (e.g., RAM, ROM, Flash memory, hard disk storage) for storing data and/or computer code for completing and/or facilitating the various processes described herein. Memory 146 may be or include non-transient volatile memory, non-volatile memory, and non-transitory computer storage media. Memory 146 may include database components, object code components, script components, or other types of information structured for supporting the various activities and information structures described herein. The memory 146 may be coupled to the processor 148 and include computer code or instructions for executing one or more processes described herein. The processor 148 may be implemented as one or more processors, application specific integrated circuits (ASICs), field programmable gate arrays (FPGAs), a group of processing components, or other suitable electronic processing components. As such, the ATM(s) 140 is configured to run a variety of application programs and store associated data in a database of the memory 146. One such application may be an application provided by the provider institution 122 for authenticating and facilitating financial operations, as discussed above.

The input/output circuit 150 of the ATM(s) 140 is structured to receive input and provide output to a variety of users (e.g., the user 102, a maintenance person, an employee of the provider institution 122, etc.). In one embodiment, the input/output circuit 150 includes an input/output device (e.g., a touchscreen, a keyboard, cash dispenser, card reader, etc.). In another embodiment, the input/output circuit 150 includes communication circuitry for facilitating the exchange of data, values, messages, and the like between an input/output device and the components of the provider institution computing system 124. In yet another embodiment, the input/output circuit 150 includes machine-readable media for facilitating the exchange of information between an input/output device and the components of the provider institution computing system 124. In still another embodiment, the input/output circuit 150 includes a combination of hardware components, communication circuitry, and machine-readable media. For example, the input/output circuit 150 is structured to receive communications from, and provide communications to, various provider institution 122 employees associated with the provider institution computing system 124, as well as from a user 102.

Figure 2:
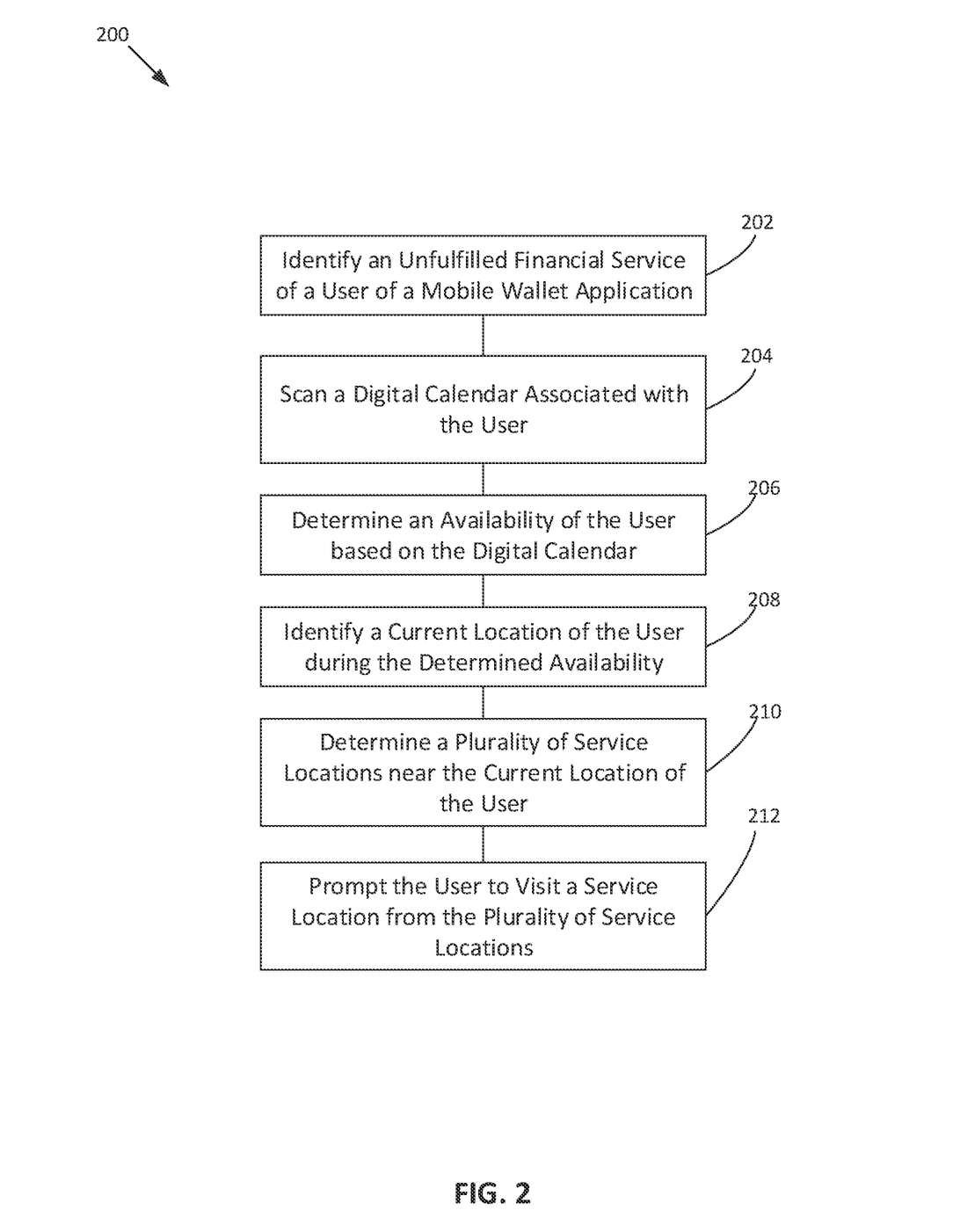
FIG. 2 is a flow diagram of a method for identifying and providing unfulfilled services to a user using the system of FIG. 1, according to an example embodiment.

Referring now to FIG. 2, a flow diagram for a method 200 for identifying and providing unfulfilled services to a user 102 is shown according to an example embodiment. Method 200 may be performed using the system of FIG. 1 so reference is to the components of FIG. 1 to aid the description of method 200.

The method 200 begins at process 202 with the provider institution computing system 124 identifying an unfulfilled service of a user 102 of a mobile application 114. In some embodiments, the provider institution computing system 124 may identify unfulfilled services via the accounts database 152 (e.g., via a flag or other identifying data entry) associated with the provider institution 122. In this regard, the database 152 may store records of partially completed services. These partial completes may be flagged in the database 152 so that the provider institution computing system 124 can readily identify customers with partially completed services. This list may then be sorted in order of priority so that users with the most pressing uncompleted services are prioritized over others by the system 124. The unfulfilled service may be any variety of financial services associated with the provider institution 122 and requiring action on behalf of the user 102. For example, the user 102 may need to stop by a service location and update their residential address in order to receive a payment/transaction card in the mail. In another example, the user 102 may need to visit a service location to fill-out paperwork pertaining to opening a new account. In yet another example, the user 102 may need to visit a service location in order to deposit money (e.g., to avoid a low-balance or overdraft penalty). In further examples, the user 102 may need to visit a service location in order to complete services associated with: payment cards, mortgages, car loans, and a variety of urgent matters (e.g., sign-by-date paperwork, account activations, loan rate decisions, etc.).

At process 204, the provider institution computing system 124 scans a digital calendar associated with the user 102 who has a determined unfulfilled service. In some embodiments, the provider institution computing system 124 may scan a digital calendar provided with the mobile application 114 as native functionality. In other embodiments, the provider institution computing system 124 may scan an established, third-party digital calendar (e.g., Microsoft, Google, Apple, etc.) via an application programming interface (API) call. For example, the provider institution computing system 124 may communicate via an API call, or via another suitable methodology for interacting with the applications of the user mobile device 104 (e.g., direct communication over a secure connection), the communication resulting in a return transmission containing a listing of every appointment on the digital calendar through a defined time period (e.g., the API call may request all appointments for today, or the next three days, or the next week, etc.). In another embodiment, the mobile application 114 of the user mobile device 104 may provide the functionality of process 204 (i.e., instead of the provider institution computing system 124). For example, the mobile application 114 may access and scan the digital calendar associated with the user 102 based on receiving a user input to access the digital calendar.

At process 206, the provider institution computing system 124 determines an availability of the user 102 with the unfulfilled service based on the digital calendar scan. In some instances, a slot of free time discovered or identified during the digital calendar scan is only considered as available if sufficient time exists for both travel to/from a service location and for completing the unfulfilled service ("sufficient time" is discussed herein with reference to FIG. 3). In some embodiments, the mobile application 114 may determine an availability of the user 102 (i.e., instead of the provider institution computing system 124). That is, the mobile application 114 may analyze the digital calendar of the user 102 and determine an availability (e.g., as illustrated above).

At process 208, the provider institution computing system 124 identifies a current location of the user 102 during the determined availability. In this regard, the "determined availability" may be in the future from when the provider institution computing system 124 determines that the user has an unfulfilled service. When this future time arrives, a new scan of the user's calendar may performed to confirm availability and then to determine the user's current location as part of process 208. As an example, the provider institution computing system 124 may determine that the user 102 is available at 3:00 P.M. on the day of the scan. As the time of day approaches 3:00 P.M., the provider institution computing system 124 may initiate a communication with the mobile application 114 to identify a current location of the user 102. The mobile application 114 is configured to utilize the location circuit 116 of the user mobile device 104 in order to provide geographical location data to the provider institution computing system 124. Furthermore, in some embodiments, the mobile application 114 may perform process 208 (i.e., instead of the provider institution computing system 124).

At process 210, the provider institution computing system 124 determines a plurality of service locations at or near the current location of the user 210 (e.g., within a predetermined radius from the current location). In particular and as described herein, the service location is an ATM. The ATM may be associated (e.g., owned, operated by, etc.) or not-associated with the provider institution (e.g., a different provider institution, a third-party provider of ATMs, etc.). The service locations may be locations associated with the provider institution 122, and simultaneously, locations which have capabilities to complete the identified unfulfilled service of the user 102 (e.g., a branch location, an ATM, etc.). Here, as mentioned above, the service locations are ATM location. In an exemplary embodiment, the ATM(s) are network enabled. Accordingly, both associated and unassociated ATMs may couple to the provider institution computing system 124 and communicate freely across the network 120. In other embodiments, the infrastructure surrounding the ATM(s) may contain the software/hardware required for connectivity across the network 120, and the infrastructure may therefore provide data relating to the ATM(s) (e.g., usage analytics, maintenance status, etc.). Furthermore, in the aforementioned example, the network-enabled ATM(s) may provide usage data to the provider institution computing system 124. The usage data (e.g., the availability status of the ATM, the maintenance status, etc.) may be used in various processes of the methods described herein. For example, the provider institution computing system 124 may incorporate the usage data in the determination of service locations to present to the user 102. In another example, the user 102 may select a service location from the plurality of service locations via the mobile application 114 of the user mobile device 104 based on the usage data (e.g., ATM X is closer than ATM Y, but ATM X is currently occupied). In yet another embodiment, usage data for non-networked ATM(s) may also be gathered and analyzed. In such an embodiment, the usage data may be gathered via various direct-connection technologies (e.g., data cable connection, etc.) or according to inferences. The provider institution computing system 124 may make such inferences about non-networked ATM(s) based on previous usage patterns. For example, the provider institution computing system 124 may infer the current status of the non-networked ATM via usage logs; the usage logs may be analyzed by the provider institution computing system 124 in order to determine a pattern, or trend, regarding the days/times during which the un-networked ATM is typically busy.

At process 212, the provider institution computing system 124 prompts the user 102 via the mobile application 114 to visit an identified or determined service location from the plurality of service locations that is capable of aiding the user to complete their unfulfilled service(s) (i.e., an identified service location from the plurality of service locations). In some embodiments, the provider institution computing system 124 prompts the user 102 via a push notification to the mobile application 114. In other embodiments, the provider institution computing system 124 prompts the user via email, SMS, or a phone call. In yet other embodiments, the provider institution computing system 124 prompts the user with various combinations of the aforementioned contact methods. The identified service location may be determined based on proximity to the user (e.g., closest), estimated wait time, and other ways described below with, for example respect to process 314 herein. In this regard, the plurality of identified service locations may be possibilities because these locations are able to help the customer fulfill their unfulfilled service. But, the identified location is selected or determined because of the capabilities and other factors (e.g., whether it is occupied, estimated wait time, location, etc.). In certain embodiments, the "identified" service location may be multiple locations because each of the locations is capable of fulfilling the unfulfilled service of the user.

In some embodiments, the provider institution computing system 124 may preemptively queue up documents relating to the unfulfilled service at the determined or identified service location (i.e., ATM). For example, the user 102 may be prompted to visit an ATM 140 in the vicinity of their current location in order to deposit money and avoid an overdraft charge. Upon arriving at the ATM 140, the user 102 may provide a first authentication (e.g., insert a payment card associated with the user 102 and enter a personal identification number (PIN)). The ATM 140 may then transmit the first authentication to the provider institution computing system 124, via the network 120, and request any documents in queue. In response, the provider institution computing system 124 may access the accounts database 152, retrieve any documents previously queued, and transmit them to the ATM 140. In some embodiments, the user 102 may be required to provide a second authentication in order to access the documents. The second authentication (e.g., two-factor authentication) may be provided, for example, via the mobile application 114 via a short-range communication protocol (e.g., Bluetooth, NFC tap, etc.). For example, the mobile application 114 may transmit authentication data (e.g., application ID, device ID, etc.) to the ATM via a short-range communication protocol (NFC tap), which serves as the second factor. Consequently, the ATM 140 may then display any documents received from the provider institution computing system 124 to the user 102. As an example, the user 102 may wish to open a new account and the provider institution computing system 124 may preemptively queue new account documents at the ATM such that the user 102 may complete the documents at the ATM (or, at a combination of the ATM, the mobile application 114, and the at the branch location) upon arrival. Accordingly, the provider institution computing system 124 may queue up a variety of documents at the identified ATM in anticipation of the user 102 arriving (e.g., mortgage documents, account documents, and/or any documents requiring further action from the user 102). For example, the user's location may be tracked via the mobile application 114 and upon the mobile application 114 being within a predefined distance of the identified ATM (e.g., ten foot radius), the document(s) are queued up for each retrieval and display to the user via the identified ATM after the user is authenticated into the identified ATM.

In alternative embodiments of process 210 and 212, the mobile application 114 of the user mobile device 104 may provide certain functionality for the processes instead of the provider institution computing system 124. For example, the user mobile device 104 via the mobile application 114 may first query (e.g., via an API call) the provider institution computing system 124 for a list of service locations within a predetermined radius of the location of the user 102 capable of helping the user complete one or more unfulfilled services. In this case, the mobile application 114 may store a list of services that are incomplete (e.g., loan documents, checking account application documents, etc.). In this way, identifying users with incomplete services is performed locally by the mobile application 114. This may reduce computing power of the provider institution computing system. Accordingly, the facilitation of completing incomplete or unfulfilled services is a feature that is only triggered when one or more unfulfilled services are identified and stored in the mobile application 114 (similarly, when flagged in the database described above). The list of service locations may then be displayed (e.g., a prompt on the mobile application 114, an SMS, a push notification, etc.) by a graphical user interface generated by the mobile application 114 to the user 102 for selection (e.g., as a drop down menu). In some embodiments, the list of service locations may be displayed on a map of the mobile application 114, and in further embodiments, the list of service locations may also contain usage data (as discussed above). In another embodiment, the mobile application 114 may determine a plurality of service locations near the identified current location of the user (i.e., instead of the provider institution computing system 124) and then subsequently filter them according to the capabilities of each service location (e.g., remove service locations from the list which are not equipped to enable the user 102 to complete the unfulfilled service). The user 102 may then select a desired service location from the plurality of service locations via the mobile application 114 (e.g., according to convenience such as, proximity, usage data, etc.). Subsequent to the user 102 selecting a desired service location, the mobile application 114 may communicate over the network 120 with the provider institution computing system 124 in order to provide the selection of the user 102, thus enabling the provider institution computing system 124 to preemptively queue documents at the selected service location (e.g., when applicable, as described above). The queued documents may then be retrieved by the user 102 according to the embodiments discussed above. Additionally, the mobile application 114 or the provider institution computing system 124 (i.e., according to the embodiment), may notify an employee associated with the provider institution 122 that the user 102 is on the way (e.g., where an employee is required to complete the service, such as with a document requiring a wet signature).

As should be appreciated, the embodiments which utilize the user mobile device 104 for processes 210 and 212, in place of the provider institution computing system 124, are also compatible with the subsequent steps illustrated in FIG. 3.

Referring now to FIG. 3, a flow diagram 300 for an alternative embodiment of the method 200 is shown, according to an example embodiment. The method 300 begins after process 210 of method 200, as described above. Accordingly, reference is still be made to the components of FIG. 1 to aid explanation of method 300.

At process 314, the provider institution computing system 124 generates a digital map from the current location of the user 102 to the identified service location. The identified service location may be selected or determined from the determined plurality of service locations based on the service location's distance from the user 102 (e.g., five miles away), the capabilities of the service location (e.g., whether the service location is capable of completing the unfulfilled service), transit times associated with traveling to/from the service location, and the current status of the service location (i.e., how busy the service location is). In some embodiments, the transit time associated with travel to/from a service location may be determined after various API calls generate digital maps to multiple, potential locations. The provider institution computing system 124 may then determine the transit time based on traffic data provided by the generated digital maps. In an illustrative example between two equally capable and non-busy service locations, the provider institution computing system 124 may select a service location based on the remaining variable (i.e., transit time). For example, service location A may be five miles away, but service location A is located on a route with heavy traffic. Alternatively, service location B may be nine miles away, but the route to the location is clear and fast moving. Accordingly, the provider institution computing system 124 may then select service location B as the identified service location. In some embodiments, the generated digital map may be displayed natively in the mobile application 114. In other embodiments, the provider institution computing system 124 generates a digital map via an API call to an established, third-party digital map provider (e.g., Google Maps, MapQuest, Waze, Bing Maps, etc.).

At process 316, the provider institution computing system 124, via the time estimation circuit 136, estimates an amount of time required to travel to/from the identified service location, and to complete the unfulfilled service. The provider institution computing system 124 may use the traffic data provided by the generated digital map to estimate a transit time. Additionally, in some embodiments, the provider institution computing system 124 may consider the return transit time as it pertains to an upcoming location, rather than the current location of the user 102. For example, the user 102 may have an appointment scheduled later in the day that requires significant travel (e.g., a business meeting located 1.5 hours away). In such an instance, the provider institution computing system 124 may consider transit time to the upcoming location, from the service location, rather than the transit time to return to the current location. Furthermore, the provider institution computing system 124 may analyze, via the time estimation circuit 136, the previous time data stored in the time aggregation database 138 in order to accurately estimate the time required to complete the unfulfilled service of the user 102. The time aggregation database 138 may contain various data points, such as the service type, the service location, how busy the service location typically is at the service start time/day, the day of the week, the service start time, the service end time, complications associated with the service which result in completion delays, etc. For example, the provider institution computing system 124 may estimate that it will take the user 102 twenty minutes to commute to the identified service location and return to their originating, current location. Continuing the example, the provider institution computing system 124 may also estimate, based on previous user data stored in the time aggregation database 138, that the unfulfilled service of the user 102 (e.g., opening a new account) typically takes, for example, forty-five minutes at the current time of day for the identified service location. Accordingly, the provider institution computing system 124 may estimate a total time of sixty-five minutes to complete the unfulfilled service. Additionally, the provider institution computing system 124 may also include additional time in the estimate based on common complications associated with the service type, as indicated by the aggregated data points in the time aggregation database 138. Further, the provider institution computing system 124 may determine that opening new accounts often includes a delay of an additional ten minutes due to users frequently forgetting identification details requisite for opening a new account. In some embodiments, the provider institution computing system 124 may include this delay as a flat time addition to the estimate. In other embodiments, the provider institution computing system 124 may average the time delay associated with the service type and include this averaged time delay in the estimate. In yet other embodiments, the provider institution computing system 124 may utilize a mathematical formula to determine an amount of time that is sufficient for the unfulfilled service. Furthermore, the provider institution computing system 124 may apply weights to the variables of said formula in order to increase its accuracy or to provide certainty to a user 102 that enough time is available for the unfulfilled service. For example, the provider institution computing system 124 may utilize a formula such as:

> Time Required To Complete the Unfulfilled Service=
> (Travel time to the service location)*1.1+
> (Travel time back from the service location)
> *1.4+(Time to complete the unfulfilled service)
> +(A constant value representing a time cushion value).

In this example, the provider institution computing system 124 applies a weight of 1.1 to the travel time, thus allotting for minor incidents along the way (e.g., unexpected traffic, an accident on the roadway, etc.). Additionally, the provider institution computing system 124 applies a weight of 1.4 to the return travel time in order to provide ample time for the return travel. Such a weight may be applied unevenly to the return transit as the conditions of the roadways and traffic in the future are likely to be less accurate than forecasts pertaining to those conditions in the present moment. Subsequently, the provider institution computing system 124 adds the previous two values with a value representing the time to complete the unfulfilled service. The time to complete the unfulfilled service may be an average from previous users or part of a more complex formula, as discussed with reference to the time aggregation database 138. Lastly, the provider institution computing system 124 may add a constant value to the formula in order to provide extra time-cushion, thus providing assurance to the user 102 that sufficient time exists to complete the unfulfilled service. The constant value may be predetermined or variable, depending on the service location and the trends determinable for the service location, from the time aggregation database 138. For example, the provider institution computing system 124 may determine that a particular service location is typically slower than others, and as such, the provider institution computing system 124 may allocated a larger (e.g., relative to other service locations) constant value to the formula. It should be understood that the formula, constants, and weight values are exemplary and that in other embodiments, a different formula with different values may be utilized.

Still referring to FIG. 3, at process 318, the provider institution computing system 124 prompts the user 102 to visit the identified service location in order to complete the unfulfilled service. The prompt includes the generated digital map and the estimated amount of time required to travel to/from and complete the unfulfilled service. Furthermore, the prompt may include a calendar invite to the user 102 in order to bookmark the previously determined availability of the user 102. In some embodiments, the calendar invite is sent to the user 102 via an API call to the calendar application used by the user 102 (e.g., Google, Apple, Microsoft, etc.). In other embodiments, the calendar invite is sent as a hyperlink via email or SMS. In some embodiments, the remainder of data present in the prompt (e.g., the digital map, the estimated time, the verbiage expressing the situation to the user 102, etc.) may be transmitted to the customer in the formats described above, in reference to method 200 (e.g., email, SMS, push notification, phone call, a combination of channels, etc.). Furthermore, similar to the method 200, the provider institution computing system 124 may preemptively queue documents relating to the unfulfilled service at the identified service location. Continuing the example of the user 102 opening a new account, the provider institution computing system 124 may preemptively queue the documents required to open a new account at the identified service location.

At process 320, the provider institution computing system 124 monitors the amount of time taken, and any other data points as exemplified previously, by the user 102 to complete the unfulfilled service at the identified service location. In some embodiments, the amount of time taken is monitored via a timer (e.g., a software-based timer mechanism) at the ATM 140. The timer may begin subsequent to the first successful authentication of the user 102 and terminate upon completion of the unfulfilled service (e.g., when the user presses a button at the ATM to affirmatively end the ATM session). The amount of time taken, and any other exemplified data points, may then be transmitted to the provider institution computing system 124 over the network 120. The provider institution computing system 124 may then aggregate and retrievably store the data points in the time aggregation database 138 in order to accurately estimate subsequent time requirements for future users. For example, the provider institution computing system 124 may monitor the new account opening of the user 102 and retrievably store the following, hypothetical data points: the service type (new account opening), the service location (service location B), how busy the service location typically is at the service start time/day (not very busy), the day of the week (Monday), the service start time (3:00 P.M.), the service end time (5:00 P.M.), complications associated with the service which result in completion delays (none). Accordingly, the provider institution computing system 124 may consider that new account openings, at this location, on Monday afternoons, without complications, takes approximately fifty-five minutes longer than anticipated. This consideration may or may not have an impact on future time estimates, depending on the quantity of data points from other users, and the trend it creates.

Based on the foregoing, another practical example of the process is as follows. A user 102 may initiate a wire transfer to a child or other authorized user of the mobile application 114 in order to help with a fiscal obligation (e.g., user 102 initiates a wire transfer for $400 to a child). In this scenario, the provider institution computing system 124 may execute the process of method 200 or method 300 for the child of user 102, as long as the child is an authorized user of the mobile application 114. Accordingly, the provider institution computing system 124 may identify the pending wire transfer as an unfulfilled service and direct the child of the user 102 to a nearby ATM to complete the transfer in a more expedited manner, according to the process of method 200 or method 300. The chosen ATM has the capability to complete the wire transfer such that ATM(s) that do not have this capability despite potentially being located closer to the user are not chosen.

Figure 4:
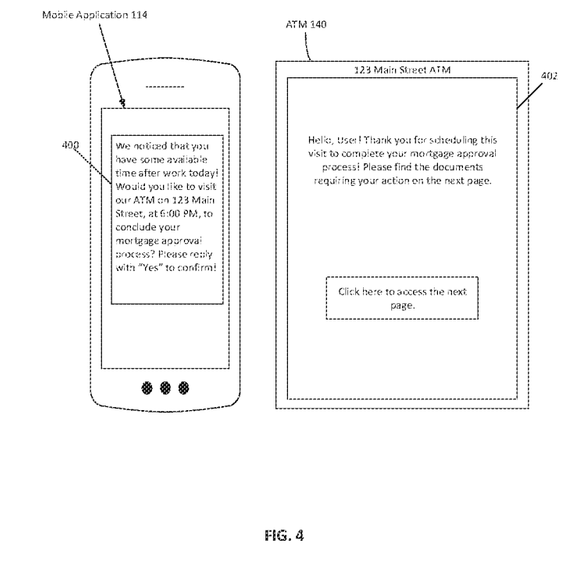
FIG. 4 is an illustrative example of a user mobile device display and an ATM display, according to an example embodiment.

Referring now to FIG. 4, graphical user interfaces of displays for the mobile device 104 (e.g., via mobile application 114) and ATM 140 are shown according to an example embodiment. The provider institution computing system 124 may have determined an availability of the user (e.g., as described in method 200 or method 300), and subsequently transmitted a prompt 400 to the user mobile device 104 (e.g., an SMS message, a push notification, email, phone call, etc.). As shown, the prompt 400 is provided by the mobile application 114, and includes an identified service location selection made by the provider institution computing system 124. The prompt 400 further requests that the user 102 reply with a confirmation message.

In response to receiving a confirmation message from the user 102, the documents relevant to the unfulfilled service of the user 102 are queued up at the ATM 140 for completion. Additionally, and in some embodiments, the user 102 may also receive a map to the ATM 140 and time estimates for both travel and completing the unfulfilled service. After authenticating with the ATM 140 (e.g., via a PIN, biometrics, mobile authentication, etc.), the user 102 may be provided a display as illustrated in 402. The ATM display 402 may provide the user with any variety of documents as needed (e.g., mortgage approval documents, as indicated in this example). Furthermore, any documents that require assistance from an employee associated with the provider institution 122, may be transmitted to a different service location (e.g., a branch location of the provider institution 122) for final completion. For example, the user 102 may arrive at the ATM 140 to complete their mortgage approval process. In other examples, the documents related to the unfulfilled service may require a final signature of an employee associated with the provider institution 122. In such an example, the provider institution computing system 124 may schedule for an employee to meet you at the service location (e.g., the ATM 140) or provide a subsequent prompt to the user mobile device 104 in accordance with method 200 or method 300.

The above-described systems and methods describe a provider institution computing system and a mobile application of a user mobile device that identifies and provides unfulfilled services to a user of the user mobile device. Consequently, improvements are garnered in efficiency, security, and network bandwidth. The above-described systems and methods serve to reduce the amount of total transmissions related to unfulfilled services. Therefore, improvements are garnered in all the tangential and/or correlated resources required to transmit data. Additionally, security is improved via the same reduction in transmissions. Many transmissions may reach unintended audiences due to the provider institution desiring to contact the user, but failing for any variety of reasons (e.g., the user hasn't updated contact information, the user lost the mobile device, the user doesn't think there is sufficient time to address the unfulfilled service, etc.). These wayward transmissions may be intercepted or simply arrive erroneously (e.g., to a malicious entity) and be used for subsequent malicious behavior. Accordingly, the innovations described improve many facets of identifying and providing unfulfilled services to a user.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

It should be understood that no claim element herein is to be construed under the provisions of 35 U.S.C. § 112(f), unless the element is expressly recited using the phrase "means for."

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for identifying and providing unfulfilled services to a user, the method comprising:
   identifying, by a provider institution computing system associated with a provider institution, an unfulfilled service of the user;
   identifying, by the provider institution computing system, a service location to complete the unfulfilled service of the user, wherein the service location comprises an automated teller machine (ATM);
   transmitting, by the provider institution computing system, information to the identified service location to complete the unfulfilled service, wherein transmitting the information includes queuing a document relating to the unfulfilled service at the identified service location;
   receiving, by the provider institution computing system, an indication of authentication via at least one first credential to authenticate into the identified service location, wherein the at least one first credential comprises a payment card engaging with the ATM at the identified service location;
   receiving, by the provider institution computing system, at least one second credential to access the information transmitted to the identified service location to complete the unfulfilled service, wherein the at least one second credential comprises authentication data specific to a provider institution mobile application, and wherein the at least one second credential is transmitted via a short-range communication protocol from a mobile device to the ATM at the identified service location;

causing, by the provider institution computing system, access to the transmitted information including the queued document based on approving the at least one second credential and the at least one first credential; and causing, by the provider institution computing system, a display of the queued document to the user at the ATM at the identified service location.

2. The method of claim 1, wherein the method further comprises causing, by the provider institution computing system, a prompt to display on the mobile device of the user, wherein the prompt comprises a generated digital map, a calendar invite, and an estimated amount of time to complete the unfulfilled service.

3. The method of claim 1, wherein identifying, by the provider institution computing system, the service location to complete the unfulfilled service of the user comprises:

identifying, by the provider institution computing system, a current location of the user during a determined availability;

determining, by the provider institution computing system, a plurality of service locations near the current location of the user during the determined availability, wherein the plurality of service locations each comprise an ATM;

determining, by the provider institution computing system, current usage data of each of the plurality of service locations based on information regarding the ATM at each of the plurality of service locations;

filtering, by the provider institution computing system, the plurality of service locations based on the current usage data and a capability of each of the plurality of service locations relative to the unfulfilled service; and identifying, by the provider institution computing system, the service location from the plurality of service locations based on the filtering.

4. The method of claim 3, wherein the plurality of service locations are ATM locations.

5. The method of claim 1, wherein the indication of authentication is based on a near-field communication tap between the ATM and the mobile device.

6. The method of claim 1, further comprising transmitting, by the provider institution computing system, a notification to a computing device at the identified service location alerting an employee of an arrival of the user at the identified service location.

7. The method of claim 1, wherein the unfulfilled service includes at least one of opening a new account, completing a fund transfer, and completing a loan application document.

8. A provider institution computing system, comprising:
a network interface circuit structured to communicate information over a network; and
a processing circuit including a processor and a memory, the memory storing instructions that when executed by the processor cause the processing circuit to perform operations including:
identify an unfulfilled service of a user;
identify a service location to complete the unfulfilled service of the user, wherein the service location comprises an automated teller machine (ATM);
transmit information to the identified service location to complete the unfulfilled service, wherein transmitting the information includes queuing a document relating to the unfulfilled service at the identified service location;
receive an indication of authentication via at least one first credential to authenticate into the identified service location, wherein the at least one first credential comprises a payment card engaging with the ATM at the identified service location;
receive at least one second credential to access the information transmitted to the identified service location to complete the unfulfilled service, wherein the at least one second credential comprises authentication data specific to a provider institution mobile application, and wherein the at least one second credential is transmitted via a short-range communication protocol from a mobile device to the ATM at the identified service location;
cause access to the transmitted information including the queued document based on approving the at least one second credential and the at least one first credential; and
cause a display of the queued document to the user at the ATM at the identified service location.

9. The provider institution computing system of claim 8, wherein the memory stores instructions that when executed by the processor further cause the processing circuit to perform operations including:
display a prompt on the mobile device of the user, wherein the prompt comprises a generated digital map, a calendar invite, and an estimated amount of time to complete the unfulfilled service.

10. The provider institution computing system of claim 8, wherein the memory stores instructions that when executed by the processor further cause the processing circuit to identify the service location to complete the unfulfilled service of the user by:
identifying a current location of the user during a determined availability;
determining a plurality of service locations near the current location of the user during the determined availability, wherein the plurality of service locations each comprise an ATM;
determining current usage data of each of the plurality of service locations based on information regarding the ATM at each of the plurality of service locations;
filtering the plurality of service locations based on the current usage data and a capability of each of the plurality of service locations relative to the unfulfilled service; and
identifying the service location from the plurality of service locations based on filtering the plurality of service locations.

11. The provider institution computing system of claim 10, wherein the plurality of service locations are ATM locations.

12. The provider institution computing system of claim 11, wherein the indication of authentication is based on a near-field communication tap between the ATM and the mobile device.

13. The provider institution computing system of claim 8, wherein the memory stores instructions that when executed by the processor further cause the processing circuit to perform operations including:
  transmit a notification to a computing device at the identified service location alerting an employee of an arrival of the user at the identified service location.

14. The provider institution computing system of claim 8, wherein the unfulfilled service includes at least one of opening a new account, completing a fund transfer, and completing a loan application document.

15. A mobile device comprising:
  a network circuit structured to communicate data to and from a provider institution computing system;
  an input/output device structured to exchange data with a user;
  a processor; and
  a memory configured to store program instructions of a provider institution mobile application that are executable by the processor to cause operations including:
    receive, from the provider institution computing system, an indication of an unfulfilled service of the user of the provider institution mobile application;
    receive, from the provider institution computing system, a service location to complete the unfulfilled service of the user, wherein the service location comprises an automated teller machine (ATM);
    estimate an amount of time for the user to travel to the ATM at the identified service location, complete the unfulfilled service, and travel back to a current location or to a location determined by scanning a digital calendar;
    receive a calendar invite via an API call to a calendar application on the mobile device;
    prompt, via a display, the user to visit the ATM at the identified service location to complete the unfulfilled service; and
    transmit, via a short range communication protocol from the mobile device to the ATM at the identified service location, at least one credential to the ATM at the identified service location to access information comprising a queued document relating to the unfulfilled service at the identified service location, wherein the at least one credential comprises authentication data specific to the provider institution mobile application.

16. The mobile device of claim 15, wherein the amount of time is further estimated based on a time cushion value and data regarding previously completed unfulfilled services, the time cushion value determined based on the identified service location and at least one trend regarding the identified service location.

17. The mobile device of claim 15, wherein the program instructions further cause operations including:
  monitor the amount of time taken by the user while completing the unfulfilled service at the identified service location.

18. The mobile device of claim 15, wherein the program instructions further cause operations including:
  determine an upcoming availability of the user based on the scanned digital calendar;
  determine a plurality of service locations near the current location of the user during a determined availability, wherein the plurality of service locations each comprise an ATM;
  determine current usage data of each of the plurality of service locations based on information regarding the ATM at each of the plurality of service locations;
  filter the plurality of service locations based on the current usage data and a capability of each of the plurality of service locations relative to the unfulfilled service; and
  identify the service location from within the plurality of service locations based on filtering the plurality of service locations.

19. The mobile device of claim 18, wherein the prompt comprises a generated digital map, the calendar invite, and an estimated amount of time to complete the unfulfilled service.

20. The mobile device of claim 15, wherein the unfulfilled service includes at least one of opening a new account, completing a fund transfer, and completing a loan application document.

* * * * *